(12) United States Patent
Zhang et al.

(10) Patent No.: US 10,078,691 B2
(45) Date of Patent: Sep. 18, 2018

(54) SYSTEM AND METHOD FOR BIOMETRICS-BASED MUSIC RECOMMENDATION

(71) Applicant: FutureWei Technologies, Inc., Plano, TX (US)

(72) Inventors: Jianyu Zhang, Santa Clara, CA (US); Chia Chin Chong, Palo Alto, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 128 days.

(21) Appl. No.: 14/142,249

(22) Filed: Dec. 27, 2013

(65) Prior Publication Data

US 2015/0186780 A1    Jul. 2, 2015

(51) Int. Cl.
G06F 17/30         (2006.01)
G06K 9/00          (2006.01)
G06N 99/00         (2010.01)

(52) U.S. Cl.
CPC ......... G06F 17/30752 (2013.01); G06K 9/00 (2013.01); G06K 9/00885 (2013.01); G06K 9/00892 (2013.01); *G06N 99/005* (2013.01)

(58) Field of Classification Search
CPC ...................................................... G06N 5/04
See application file for complete search history.

(56) References Cited

U.S. PATENT DOCUMENTS 8,442,969 B2* 5/2013 Gross ................ G06F 17/30867
707/709
2010/0142720 A1* 6/2010 Kon ........................ H04R 29/00
381/74
2011/0169603 A1* 7/2011 Fithian ................... G06Q 10/00
340/5.52
2012/0229270 A1* 9/2012 Morley ................. A61B 5/6806
340/539.12
2014/0171039 A1* 6/2014 Bjontegard ....... H04L 29/06034
455/414.1

FOREIGN PATENT DOCUMENTS

WO    WO 2014018687 A1 * 1/2014 ......... G06F 17/2785

OTHER PUBLICATIONS

Rho et al., SVR-based Music Mood Classification and Context-based Music Recommendation, Oct. 2009, ACM, pp. 713-716.*

* cited by examiner

Primary Examiner — Alan S Chen
(74) Attorney, Agent, or Firm — Slater Matsil, LLP

(57) ABSTRACT

Embodiments are provided herein for providing biometrics-based music recommendations to users. The biometric-based music recommendations take into account the changing music preferences of users from time to time as their biometrics change, such as due to users wellness states, being in different moods, engagement in different activities, and/or entering different environments. The schemes herein are implemented on user devices equipped or coupled to wearable devices capable of collecting biometrics data from users, such as heart rate, perspiration, and skin temperature data. The biometrics data of a user are collected and then processed into biometrics information. The biometrics information is then classified into a current wellness state of the user. A music recommendation is then provided to the user according to the biometrics information and the current wellness state of the user.

18 Claims, 5 Drawing Sheets

SYSTEM AND METHOD FOR BIOMETRICS-BASED MUSIC RECOMMENDATION

TECHNICAL FIELD

The present invention relates to the field of digital music recommendation systems and services, and, in particular embodiments, to a system and method for biometrics-based music recommendation.

BACKGROUND

Music recommendation systems and services such as Pandora, Ringo and Spotify are popular ways for users to find and listen to music that may be of interest to them. However, such music recommendation services or applications (software) identify music for the user to listen to based on the user's personal preferences as indicated by the user. For example, the user can indicate his preferences through manual selection or some other type of affirmative user action indicating the user's preferences, e.g., by clicking on a "like" icon or providing a rating. The recommendation may also be made based on previous user selection history or similar other users selections. However, such music recommendation systems and services are relatively inflexible in that they generally do not take into account changing music preferences of users at different times, such as according to users moods and wellness. Taking such factors into consideration can enhance recommendation choices and user experience.

SUMMARY OF THE INVENTION

In accordance with an embodiment, a method by a user device for providing biometrics based music recommendation to a user includes determining biometrics information according to biometrics data of the user. The biometrics information are then classified into a current wellness state of the user. The method further includes providing a music recommendation to the user according to the biometrics information and the current wellness state of the user.

In accordance with another embodiment, a method by a user device for providing biometrics based music recommendation to a user includes receiving a biometric identifier representing a current wellness state of the user, and receiving a mood classifier representing a current mood of the user. The method further includes determining a music recommendation according to a predefined mapping between the biometric identifier and the mood classifier. The music recommendation is then indicated to the user In accordance with another embodiment, a user device for providing biometrics based music recommendation to a user comprises at least one processor and a non-transitory computer readable storage medium storing programming for execution by the at least one processor. The programming includes instructions to determine biometrics information according to biometrics data of the user. Additional instructions on the device include classifying the biometrics information into a current wellness state of the user. The programming further configures the device to provide a music recommendation to the user according to the biometrics information and the current wellness state of the user.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments are provided herein for a system and methods to provide biometrics-based music recommendations to users. The biometric-based music recommendations take into account the changing music preferences of users from time to time as their biometrics change, for instance due to users wellness states, being in different moods, engagement in different activities, and/or entering different environments. Some emerging wearable devices, such Fitbit Flex™, Nike Fuelband™, Jawbone UP™, Basis Smartwatch™, and Samsung Galaxy Gear™, are capable of collecting biometrics data from users, such as heart rate, perspiration, and skin temperature data. Such data can be further synchronized with or sent to, e.g., via Bluetooth or other wireless connectivity, the users' mobile or personal devices, e.g., smartphones, computer tablets, laptop computers, desktop computers. Some user mobile or personal devices, e.g., smartphones, include embedded biometric sensors, e.g., temperature sensors, heart rate sensors, and sweat sensors, which can also be used to collect the users' biometrics data.

The embodiments herein make use of the unprocessed biometrics data collected using such biometric sensor devices to generate useful biometrics information about the users, which can change from time to time, and accordingly provide biometric-based music recommendations to the users. The collection of biometrics data to provide biometrics information and accordingly biometrics-based music recommendations can be performed automatically, e.g., without direct user intervention or action, thus improving user experience. The biometrics-based music recommendation can also be combined with other music recommendation schemes such as based on user indicated preferences and manual selections.

Figure 1:
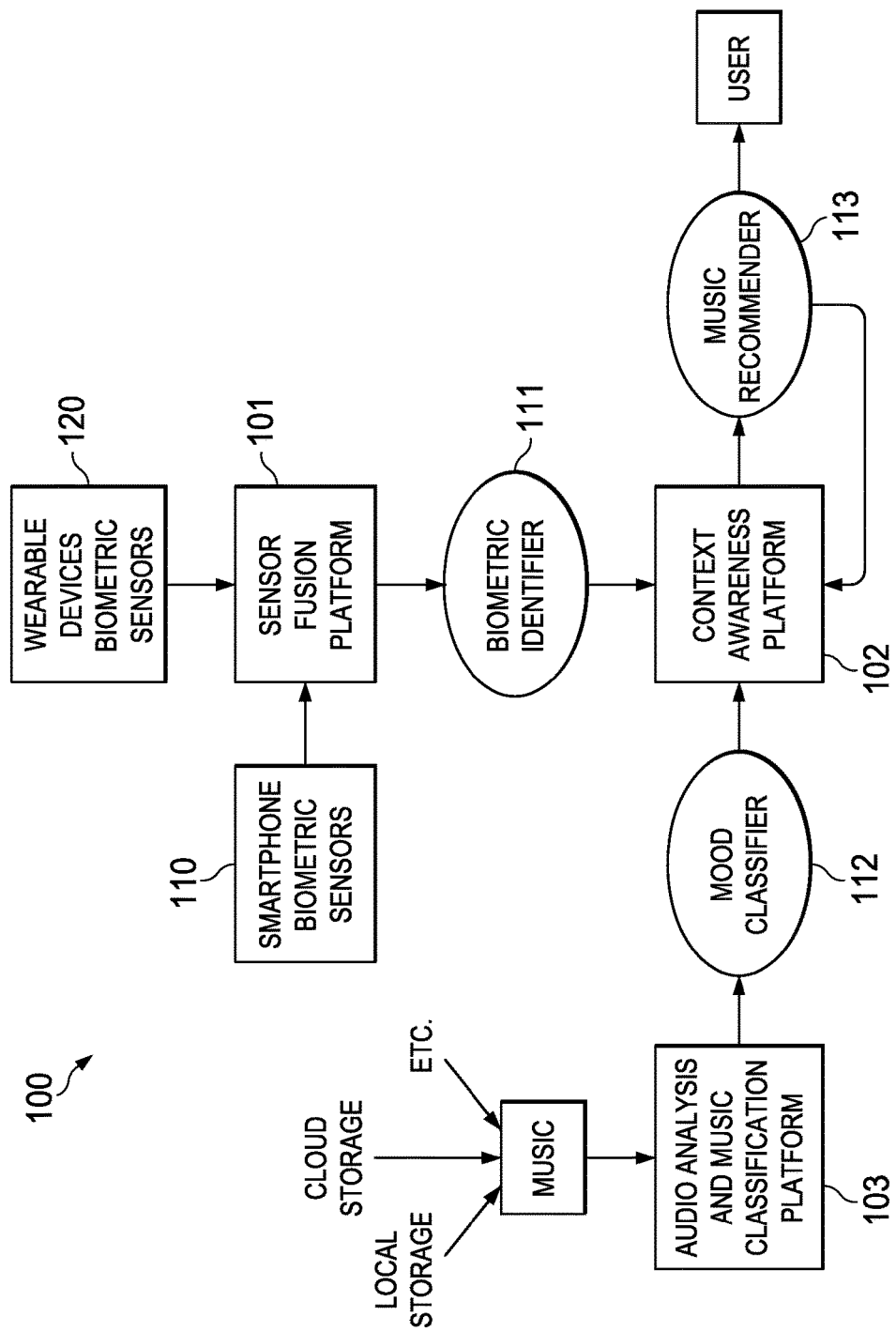
FIG. 1 illustrates an embodiment of a system for biometric-based music recommendation.

FIG. 1 illustrates an embodiment of a system 100 for biometric-based music recommendation. The system 100 can be implemented on a mobile or personal user device, such as a smartphone or a computer tablet, with or without the use of a separate wearable or otherwise biometric sensor equipped device. The mobile or personal device may comprise biometric sensors for collecting biometrics data and/or may communicate, e.g. via a wireless connection, with the separate device with biometric sensing capability.

For instance, the system 100 includes one or more smartphone biometric sensors 110 and/or one or more wearable device biometric sensors 120 that can connect to the user's smartphone. The biometric sensors 110 and/or 120 collect unprocessed or "raw" biometric sensor data associated with a user. The raw data is sent to a biometric sensor fusion platform 101, which infers the collected data into various wellness categories, such as anxiety, stress, fatigue, or other categories. Each category can be represented by a wellness or biometric identifier 111.

After providing a biometric identifier 111 for a user, the biometric sensor fusion platform 101 feeds it into the context awareness platform 102, which then generates accordingly a music recommender 113 representing a music recommendation for the user. The music recommender may be a list of an ID or value that triggers a list of corresponding music selections, in accordance with user biometric information and user mood. The music selections may be randomly generated as long as they are mapped to the biometric information and user mood. The context awareness platform 102 analyzes and learns (over time) the user music preferences in each of the wellness or biometric categories to generate a music recommender 113 in response to a biometric identifier 111. The learning process allows the context awareness platform 102 to improve its recommendation accuracy over time.

Additionally, an audio analysis and music classification platform 103 classifies songs into different mood categories such as happy, ecstatic, content, sad, depressed, nervous, angry, bored, tired, hyper, excited, grumpy, or aggressive. Each mood category can be represented by a mood classifier 112. The type of song to be recommended, by the context awareness platform 102, to a user is also based on a mood classifier 112 at a moment of time. The mood classifier 112 is mood ID or value obtained, by the audio analysis and music classification platform 103, based on current or recent user music selection, e.g., from local storage (on device) and/or cloud storage.

The system 100 is a learning system, where the context awareness platform 102 learns to predict what the user would listen to according to the user's biometrics data. The learning process allows determining the user mood according to the biometrics information, or mapping the biometric identifier 111 to a mood classifier 112. The determined user mood, according to user current or recent music selection, is used to provide the music recommendation (music recommender 113). The learning process also includes using feedback according to user selection behavior to improve the prediction accuracy of the context awareness platform 102. For example, if the user accepts the music recommender 113 selection, then the mapping or determination of the context awareness platform 102 is deemed accurate. If the user rejects the music recommender 113 selection, then the mapping is modified. When the learning process results in accurate mapping between the biometric identifier 111 to a mood classifier 112 to provide an accurate prediction of the music recommender 113, the context awareness platform 102 can provide a music recommendation that agrees with the user choice independent of or without any further affirmative user action or selection.

The biometric sensor fusion platform 101, context awareness platform 102, and audio analysis and music classification platform 103 may be implemented via software, hardware, or both, for instance on the smartphone or the wearable device. In another scenario, the platforms of the system 100 may be implemented as part of a software based application or service accessible via online (Internet) using any suitable device, such as a smartphone or a personal computer device. The application or service receives biometrics data (e.g., via any suitable network communications) from a device with biometric sensing capability and communicates with the user device to provide the music recommender 113.

Figure 2:
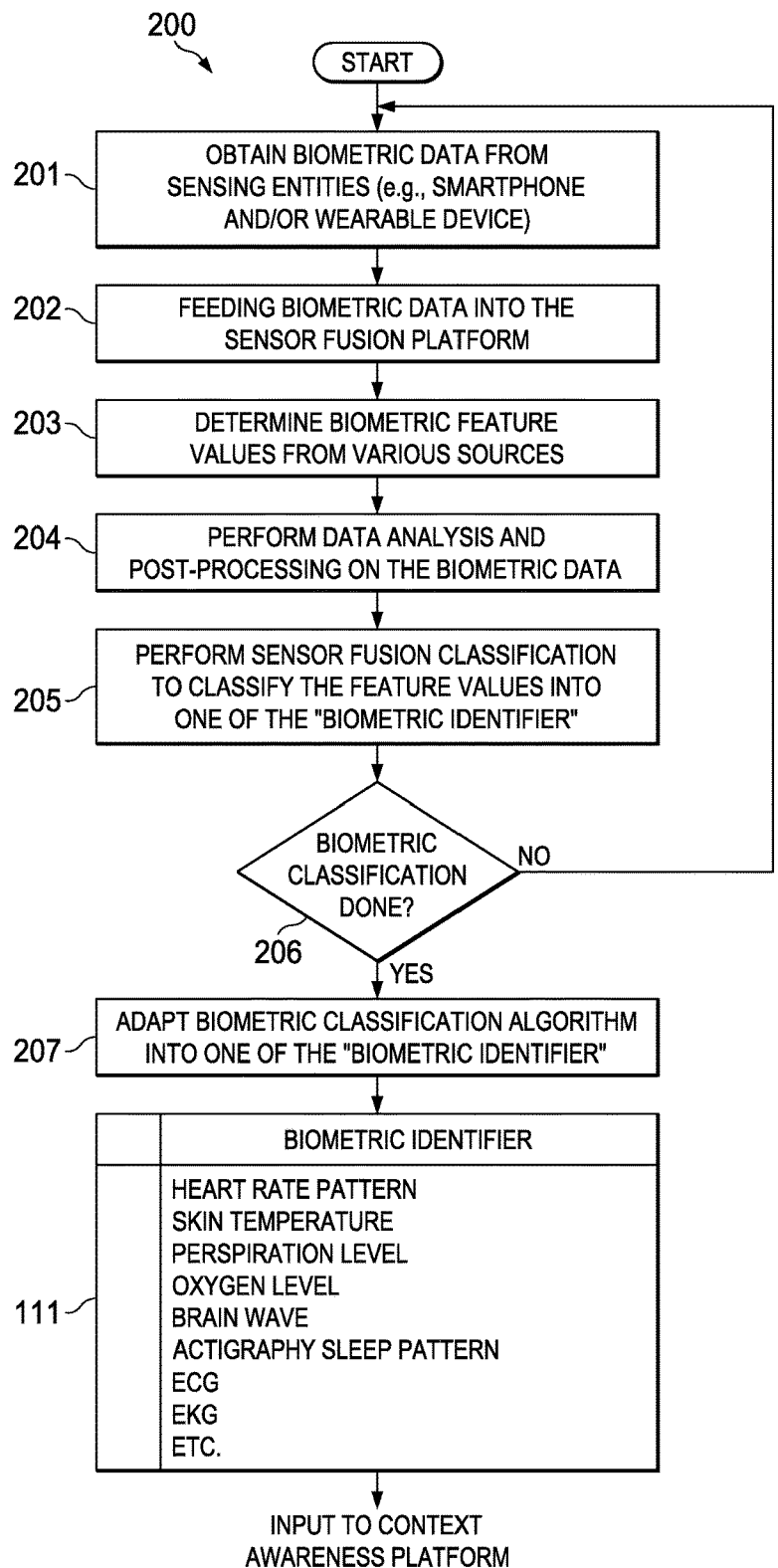
FIG. 2 illustrates another embodiment of a method for biometric-based music recommendation.

FIG. 2 illustrates of an embodiment method 200 that can be implemented at the biometric sensor fusion platform 101. At step 210, biometrics data is obtained from one or more sensing entities or sensors, e.g., at a smartphone and/or a wearable device. At step 202, the biometrics data is fed into the sensor fusion platform 101. At step 203, the sensor fusion platform 101 determines biometric feature values or data from the various sources above. At step 204, the platform 101 performs analysis and post-processing on the biometrics data. At step 205, sensor fusion classification is performed to classify the feature values into one of the biometric identifiers 111. At step 206, the method 200 checks if biometric classification is finished. If the biometric classification process is not finished, the method 200 returns to step 201 to process more biometrics data. If the process is finished, the method 200 proceeds to step 207 where the sensor fusion platform 101 adapts the biometric classification algorithm into one of the biometric identifiers 111. Examples of wellness or biometric categories that can be classified by biometric (or wellness) identifiers in include anxiety, stress, fatigue. The categories are classified according to the biometrics information, which may include heart rate pattern, skin temperature, perspiration level, oxygen level, brain wave, actigraphy sleep pattern, ECG, EKG, and/or other biometrics information types.

Figure 3:
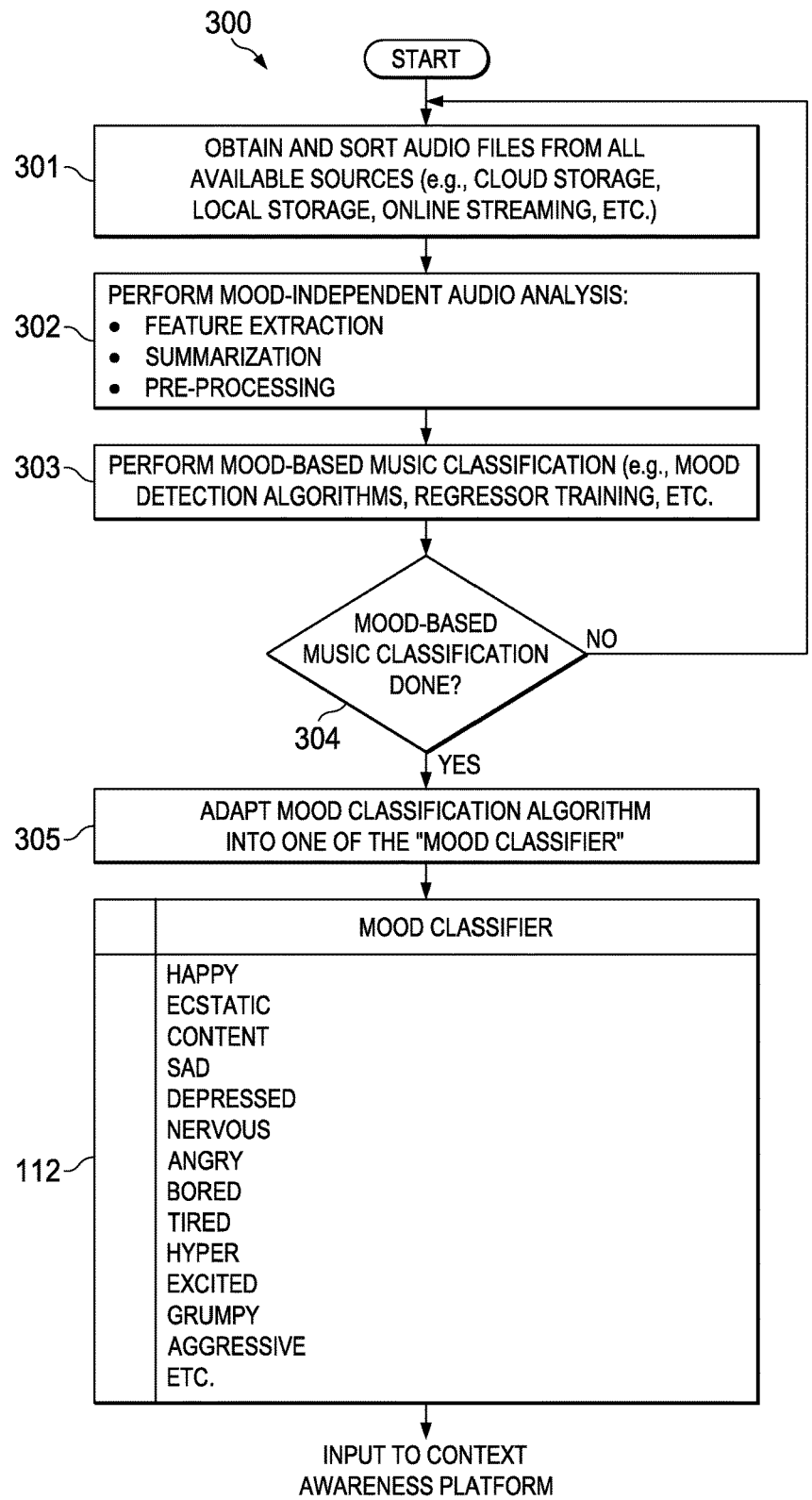
FIG. 3 illustrates another embodiment of a method for biometric-based music recommendation.

FIG. 3 an embodiment method 300 that can be implemented at the audio analysis and music classification platform 103. At step 301, audio files are obtained and sorted from all available sources for the user, for example from cloud storage, local storage (on the user device), or online streaming. At step 302, the audio analysis and music classification platform 103 performs mood-independent audio analysis, including feature extraction, summarization, and pre-processing. At step 303, the audio analysis and music classification platform 103 performs mood-based music classification, for example using mood detection algorithms or regressor training. At step 304, the method 300 determines if mood-based music classification is finished. If mood-based music classification is finished is not finished, the method 300 returns to step 301 to process more audio files. If mood-based music classification is finished, the method 300 proceeds to step 305 where the audio analysis and music classification platform 103 adapts the mood classification algorithm into one of the mood classifiers 112.

Examples of mood classifications or categories that can be classified by mood classifiers 112 include happy, ecstatic, content, sad, depressed, nervous, angry, bored, tired, hyper, excited, grumpy, aggressive, and/or other mood types.

Figure 4:
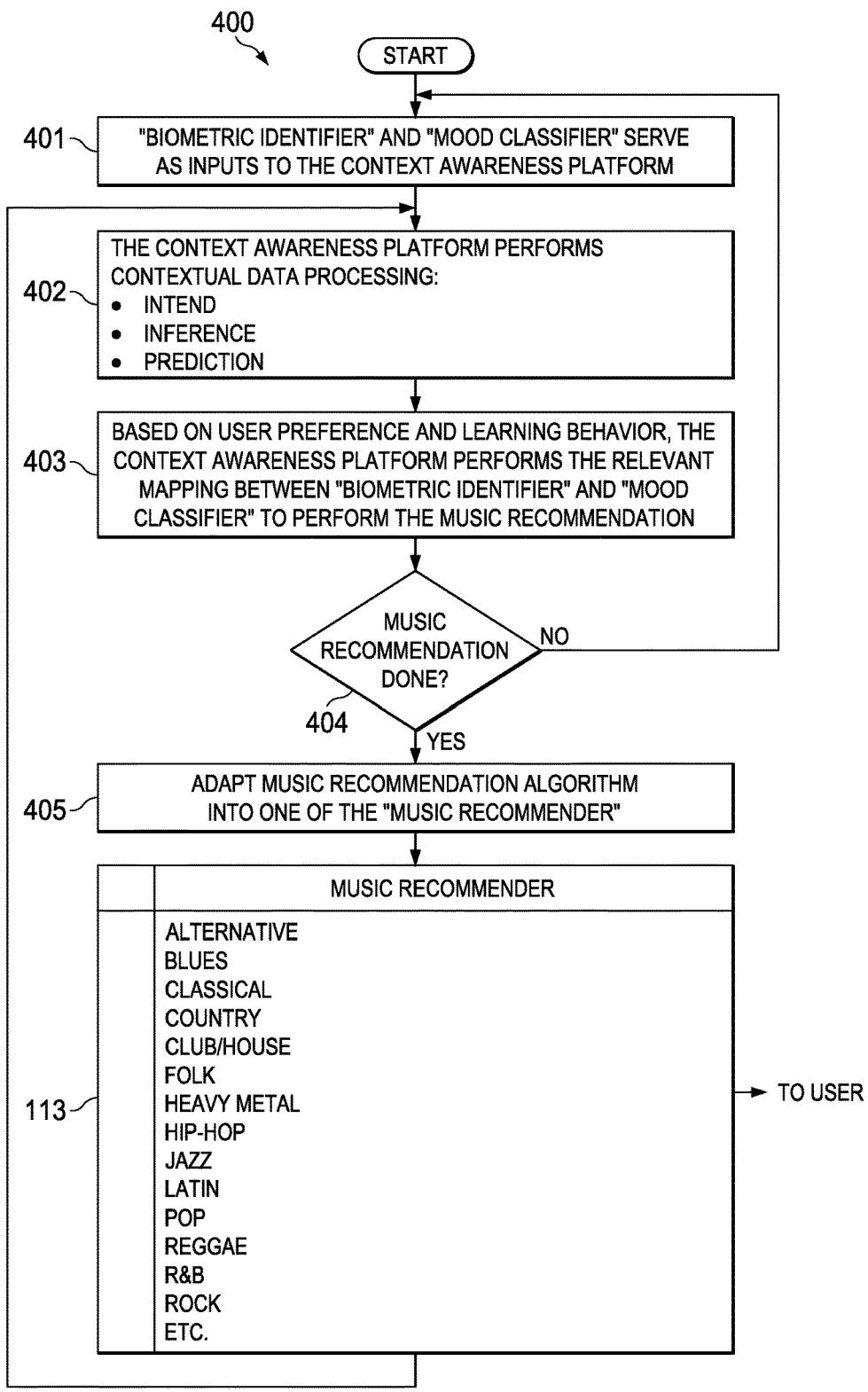
FIG. 4 illustrates another embodiment of a method for biometric-based music recommendation.

FIG. 4 illustrates an embodiment method 400 that can be implemented at the context awareness platform 102. At step 401, the biometric identifier 111 and mood classifier 112 serve as inputs to the context awareness platform 102. At step 402, the context awareness platform 102 performs contextual data processing, including intend, inference, and prediction operations. At step 403, the context awareness platform 102 performs, based on user preferences and learning behavior, the relevant mapping between the biometric identifier 111 and mood classifier 112 to perform the music recommendation. At step 404, the method 400 checks if music recommending is finished. If music recommendation is not finished, the method 400 returns to step 401 for obtaining more input and continue processing. If music recommendation is finished, the method 400 proceeds to step 405, where the context awareness platform 102 adapts the music recommendation algorithm into one of the music recommenders 113. Examples of music recommendations that can be classified by the music recommenders 113 include alternative, blues, country, jazz, and/or music genres.

Figure 5:
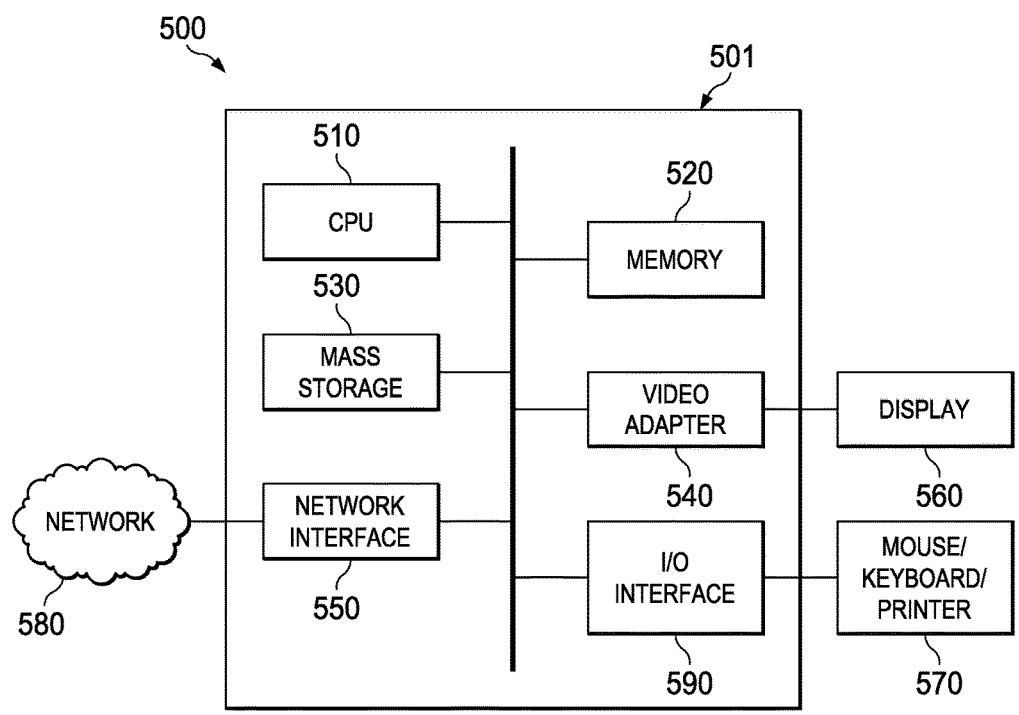
FIG. 5 is a diagram of an exemplary processing system that can be used to implement various embodiments.

FIG. 5 is a block diagram of an exemplary processing system 500 that can be used to implement various embodiments. The processing system may be part of or correspond to a mobile r personal user device, such as a smartphone. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 500 may comprise a processing unit 501 equipped with one or more input/output devices, such as a speaker, microphone, mouse, touchscreen, keypad, keyboard, printer, display, and the like. The processing unit 501 may include a central processing unit (CPU) 510, a memory 520, a mass storage device 530, a video adapter 540, and an Input/Output (I/O) interface 590 connected to a bus. The bus may be one or more of any type of several bus architectures including a memory bus or memory controller, a peripheral bus, a video bus, or the like.

The CPU 510 may comprise any type of electronic data processor. The memory 520 may comprise any type of system memory such as static random access memory (SRAM), dynamic random access memory (DRAM), synchronous DRAM (SDRAM), read-only memory (ROM), a combination thereof, or the like. In an embodiment, the memory 520 may include ROM for use at boot-up, and DRAM for program and data storage for use while executing programs. The mass storage device 530 may comprise any type of storage device configured to store data, programs, and other information and to make the data, programs, and other information accessible via the bus. The mass storage device 530 may comprise, for example, one or more of a solid state drive, hard disk drive, a magnetic disk drive, an optical disk drive, or the like.

The video adapter 540 and the I/O interface 590 provide interfaces to couple external input and output devices to the processing unit. As illustrated, examples of input and output devices include a display 560 coupled to the video adapter 540 and any combination of mouse/keyboard/printer 570 coupled to the I/O interface 590. Other devices may be coupled to the processing unit 501, and additional or fewer interface cards may be utilized. For example, a serial interface card (not shown) may be used to provide a serial interface for a printer.

The processing unit 501 also includes one or more network interfaces 550, which may comprise wired links, such as an Ethernet cable or the like, and/or wireless links to access nodes or one or more networks 580. The network interface 550 allows the processing unit 501 to communicate with remote units via the networks 580. For example, the network interface 550 may provide wireless communication via one or more transmitters/transmit antennas and one or more receivers/receive antennas. In an embodiment, the processing unit 501 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method by a user device for providing biometrics based music recommendation to a user, the method comprising:
   determining biometrics information for the user according to physical biometrics data of the user;
   classifying the biometrics information into a current user biometric identifier representing a current music-independent physically-based wellness state of the user;
   classifying a current or recent user music selection by the user into a current user mood classifier representing a current user emotional mood;
   mapping the current user biometric identifier to the current user mood classifier; and
   providing a music recommendation to the user according to the mapping between the current user biometric identifier and the current user mood classifier, the current user biometric identifier and the current user mood classifier being different from each other.

2. The method of claim 1 further comprising collecting the physical biometrics data using a biometric sensor embedded in the user device.

3. The method of claim 1 further comprising receiving, at the user device, the physical biometrics data from a separate device comprising a biometric sensor via a connection between the user device and the separate device.

4. The method of claim 1, wherein classifying the biometrics information into the current user biometric identifier includes selecting the current user biometric identifier from a plurality of biometric identifiers representing a plurality of corresponding predefined music-independent physically-based wellness states of the user.

5. The method of claim 4, wherein providing the music recommendation to the user according to the current user biometric identifier and the current user mood classifier includes providing the current user biometric identifier and the current user mood classifier to a music recommender.

6. The method of claim 1, wherein classifying the current or recent user music selection by the user into a current user mood classifier includes selecting the current user mood classifier from a plurality of mood classifiers representing a plurality of corresponding predefined user emotional moods.

7. The method of claim 1, further comprising learning a mapping between user biometrics identifiers and user mood classifiers according to music selection feedback and behavior of the user.

8. The method of claim 1, further comprising changing the music recommendation to the user from time to time according to changes in at least one of the current user mood classifier or the physical biometrics data.

9. A method by a user device for providing biometrics based music recommendation to a user, the method comprising:
receiving a current user biometric identifier representing a current music-independent physically-based wellness state of the user based on physical biometrics data for the user;
receiving a current user mood classifier representing a current emotional mood of the user based on a current or recent user music selection by the user;
determining a music recommendation according to a predefined mapping between the current user mood classifier and the current user biometric identifier, the current user biometric identifier and the current user mood classifier being different from each other; and
indicating the music recommendation to the user.

10. The method of claim 9 further comprising establishing the predefined mapping between the current user biometric identifier and the current user mood classifier in accordance with music preferences and learning a music selection behavior of the user.

11. The method of claim 9 further comprising:
receiving the physical biometrics data collected from one or more biometric sensor devices;
determining biometrics information of the user according to the physical biometrics data; and
classifying the biometrics information into the current user biometric identifier representing the current music-independent physically-based wellness state of the user.

12. The method of claim 9 further comprising:
collecting music files from one or more user storages; and
classifying, using audio analysis, the music files into mood-based classifications representing emotional moods of the user.

13. A user device for providing biometrics based music recommendation to a user, the user device comprising:
at least one processor; and
a non-transitory computer readable storage medium storing programming for execution by the at least one processor, the programming including instructions to:
determine biometrics information for the user according to physical biometrics data of the user;
classify the biometrics information into a current user biometric identifier representing a current music-independent physically-based wellness state of the user;
classify a current or recent user music selection by the user into a current user mood classifier representing a current user emotional mood;
mapping the current user biometric identifier to the current user mood classifier; and
provide a music recommendation to the user according to the mapping between the current user biometric identifier and the current user mood classifier, wherein the current user biometric identifier and the current user mood classifier are different from each other.

14. The user device of claim 13, wherein the user device further comprises an embedded biometric sensor, and wherein the programming includes further instructions to collect the physical biometrics data using the embedded biometric sensor.

15. The user device of claim 14, wherein the embedded biometric sensor is one of a temperature sensor, a heart rate sensor, or a sweat sensor.

16. The user device of claim 13, wherein the user device is connected to a separate device with biometric sensing capability, and wherein the programming includes further instructions to receive the physical biometrics data from the separate device.

17. The user device of claim 13, wherein the programming includes further instructions to learn a mapping between user biometric identifiers and user mood classifiers according to music selection feedback and behavior of the user.

18. The user device of claim 17, wherein the instructions to determine the current user emotional mood according to current or recent user music selection includes instructions to:
collect music files from one or more user storages; and
classify, using audio analysis, the music files into mood-based classifications representing emotional moods of the user.

* * * * *